US010248281B2

(12) United States Patent
Dow et al.

(10) Patent No.: US 10,248,281 B2
(45) Date of Patent: *Apr. 2, 2019

(54) CONTROLLING INPUT TO A PLURALITY OF COMPUTER WINDOWS

(71) Applicant: International Business Machines Corporation, Armonk, NY (US)

(72) Inventors: Eli M. Dow, Wappingers Falls, NY (US); James P. Gilchrist, Milford, CT (US); Brendan C. Lewis, Poughkeepsie, NY (US); Khaalid P. J. McMillan, Wappingers Falls, NY (US); Christopher J. Nycz, Wallkill, NY (US)

(73) Assignee: International Business Machines Corporation, Armonk, NY (US)

( * ) Notice: Subject to any disclaimer, the term of this patent is extended or adjusted under 35 U.S.C. 154(b) by 317 days.

This patent is subject to a terminal disclaimer.

(21) Appl. No.: 14/936,721

(22) Filed: Nov. 10, 2015

(65) Prior Publication Data

US 2017/0052651 A1    Feb. 23, 2017

Related U.S. Application Data

(63) Continuation of application No. 14/828,550, filed on Aug. 18, 2015.

(51) Int. Cl.
| G06F 3/048 | (2013.01) |
| G06F 3/0481 | (2013.01) |
| G06F 3/01 | (2006.01) |

(52) U.S. Cl.
CPC ............ *G06F 3/0481* (2013.01); *G06F 3/013* (2013.01)

(58) Field of Classification Search
CPC ... G06F 3/00; G06F 3/01; G06F 3/013; G06F 3/02; G06F 3/0227; G06F 3/048; G06F 3/0481; G06F 3/0485
See application file for complete search history.

(56) References Cited

U.S. PATENT DOCUMENTS

| 5,831,594 A | 11/1998 | Tognazzini et al. |
| 6,396,521 B1 | 5/2002 | Lai et al. |
| 6,961,906 B2 * | 11/2005 | Hansen ............... G06F 3/03543 345/157 |
| 7,114,129 B2 | 9/2006 | Awada et al. |
| 7,614,011 B2 | 11/2009 | Karidis et al. |

(Continued)

FOREIGN PATENT DOCUMENTS

WO    2012008827 A1    1/2012

OTHER PUBLICATIONS

"WizMouse: At a glance", PCWorld, Oct. 15, 2010 (3 pages).

(Continued)

*Primary Examiner* — Xiomar L Bautista
(74) *Attorney, Agent, or Firm* — Jordan T. Schiller

(57) ABSTRACT

A method for controlling user input to a plurality of computer windows is provided. The method determines an input window and an output window, directs a plurality of input commands including primary and secondary input commands to the input window, determines when a user is visually focusing on the output window, and directing the secondary input commands to the output window, while the primary input commands remain directed to the input window.

5 Claims, 3 Drawing Sheets

(56) References Cited

U.S. PATENT DOCUMENTS

| | | | |
|---|---|---|---|
| 8,225,229 B2 | 7/2012 | Thorn et al. | |
| 8,468,462 B2 | 6/2013 | Adams | |
| 9,185,352 B1* | 11/2015 | Jacques | H04N 7/18 |
| 9,619,020 B2* | 4/2017 | George-Svahn | G06F 3/013 |
| 9,760,238 B2 | 9/2017 | Wang et al. | |
| 2003/0020755 A1* | 1/2003 | Lemelson | G06F 3/013 |
| | | | 715/786 |
| 2004/0240708 A1* | 12/2004 | Hu | G06F 3/012 |
| | | | 382/103 |
| 2005/0204026 A1* | 9/2005 | Hoerl | G06F 3/0227 |
| | | | 709/223 |
| 2008/0024433 A1 | 1/2008 | Gunther et al. | |
| 2008/0256483 A1* | 10/2008 | Katsuranis | G06F 3/011 |
| | | | 715/784 |
| 2009/0288039 A1* | 11/2009 | Mail | G06F 3/038 |
| | | | 715/815 |
| 2010/0077345 A1 | 3/2010 | Swingler et al. | |
| 2011/0148926 A1* | 6/2011 | Koo | G06F 3/017 |
| | | | 345/635 |
| 2012/0072820 A1 | 3/2012 | Weinman, Jr. | |
| 2013/0227466 A1 | 8/2013 | Mail et al. | |
| 2014/0049462 A1* | 2/2014 | Weinberger | G06F 3/013 |
| | | | 345/156 |
| 2014/0285422 A1* | 9/2014 | Kang | G06F 3/04883 |
| | | | 345/156 |
| 2014/0340334 A1* | 11/2014 | Cho | G06F 3/013 |
| | | | 345/173 |
| 2015/0138079 A1* | 5/2015 | Lannsjo | G06F 3/013 |
| | | | 345/156 |
| 2015/0199007 A1* | 7/2015 | Lee | G06F 3/012 |
| | | | 345/156 |
| 2016/0116980 A1* | 4/2016 | George-Svahn | G06F 3/013 |
| | | | 345/168 |
| 2016/0224111 A1* | 8/2016 | Kim | G06F 3/0488 |
| 2016/0313890 A1* | 10/2016 | Walline | G06F 3/04812 |
| 2017/0052648 A1 | 2/2017 | Dow et al. | |
| 2017/0177078 A1* | 6/2017 | Henderek | G06F 3/013 |

OTHER PUBLICATIONS

"WizMouse makes your mouse wheel work on the window under the mouse," webpage printout from https://antibody-software.com/ (printed Aug. 11, 2015) (3 pages).

Pending U.S. Appl. No. 14/828,550, filed Aug. 18, 2015 entitled: "Controlling Input to a Plurality of Computer Windows", 27 pages.

IBM, List of IBM Patents or Patent Applications Treated as Related, Appendix P, dated Feb. 28, 2016, 2 pages.

Pending U.S. Appl. No. 14/828,550, filed Aug. 18, 2015, Entitled: "Controlling Input to a Plurality of Computer Windows".

* cited by examiner

CONTROLLING INPUT TO A PLURALITY OF COMPUTER WINDOWS

BACKGROUND

The present invention generally relates to controlling input to a plurality of computer windows, and more particularly to directing input to a computer window that a user is visually focused on.

In a multiple window computing environment, a computer user may have multiple computer windows open or displayed on a display device (e.g., a computer monitor). To enter data into a particular computer window (i.e., directing input commands to an application associated with the particular computer window), the user focuses on the particular window or causes the particular window to become active. Focusing (or activation) may occur by some activity by the user, e.g., clicking on the desired window with a cursor on the display and a mouse button, or by hovering the cursor over the desired window. Generally, such activation requires physical manipulation of an input device, e.g., by the user's hands. If a second computer window is open, the user focuses on (or activates) the second computer window prior to entering data into the second window. Typically, when focus is directed to a particular window, data entry (including input commands) is exclusively directed to the active window. To resume entering data in the initial computer window, the user returns focus to the initial computer window and the second computer window becomes inactive.

SUMMARY

According to one embodiment, a method for controlling user input to a plurality of computer windows is provided. The method may include determining an input window from the plurality of computer windows, determining an output window from the plurality of computer windows, directing a plurality of input commands to the input widow. The plurality of input commands includes at least one of one or more primary input commands and one or more secondary input commands. The method may further include determining that the user is visually focusing on the output window and directing, in response to the determination that the user is visually focusing on the output window, the one or more secondary input commands to the output window. The one or more primary input commands remain directed to the input window.

According to another embodiment, a computer program product for controlling user input to a plurality of computer windows is provided. The computer program product may include at least one computer readable non-transitory storage medium having computer readable program instructions for execution by a processor. The computer readable program instructions include instructions for determining an input window and an output window from the plurality of computer windows, directing a plurality of input commands to the input widow including at least one of primary and secondary input commands, determining that the user is visually focusing on the output window, and directing the secondary input commands to the output window.

According to another embodiment, a computer system for controlling user input to a plurality of computer windows is provided. The system may include at least one processor, at least one computer readable memory, at least one computer readable tangible, non-transitory storage medium, and program instructions stored on the at least one computer readable tangible, non-transitory storage medium for execution by the at least one processor via the at least one computer readable memory. The program instructions include instructions for determining an input window and an output window from the plurality of computer windows, directing a plurality of input commands to the input widow including at least one of primary and secondary input commands, determining that the user is visually focusing on the output window, and directing the secondary input commands to the output window.

BRIEF DESCRIPTION OF THE SEVERAL VIEWS OF THE DRAWINGS

The following detailed description, given by way of example and not intended to limit the invention solely thereto, will best be appreciated in conjunction with the accompanying drawings, in which.

The drawings are not necessarily to scale. The drawings are merely schematic representations, not intended to portray specific parameters of the invention. The drawings are intended to depict only typical embodiments of the invention. In the drawings, like numbering represents like elements.

DETAILED DESCRIPTION

Various embodiments of the present invention will now be discussed with reference to FIGS. 1-3, like numerals being used for like and corresponding parts of the various drawings.

According to one embodiment, a method is provided for controlling user input to a plurality of computer windows by determining an input window and an output window, directing input commands including at least one of primary and secondary input commands to the input window, determining when the user is visually focusing on the output window, and directing the secondary input commands to the output window.

Figure 1:
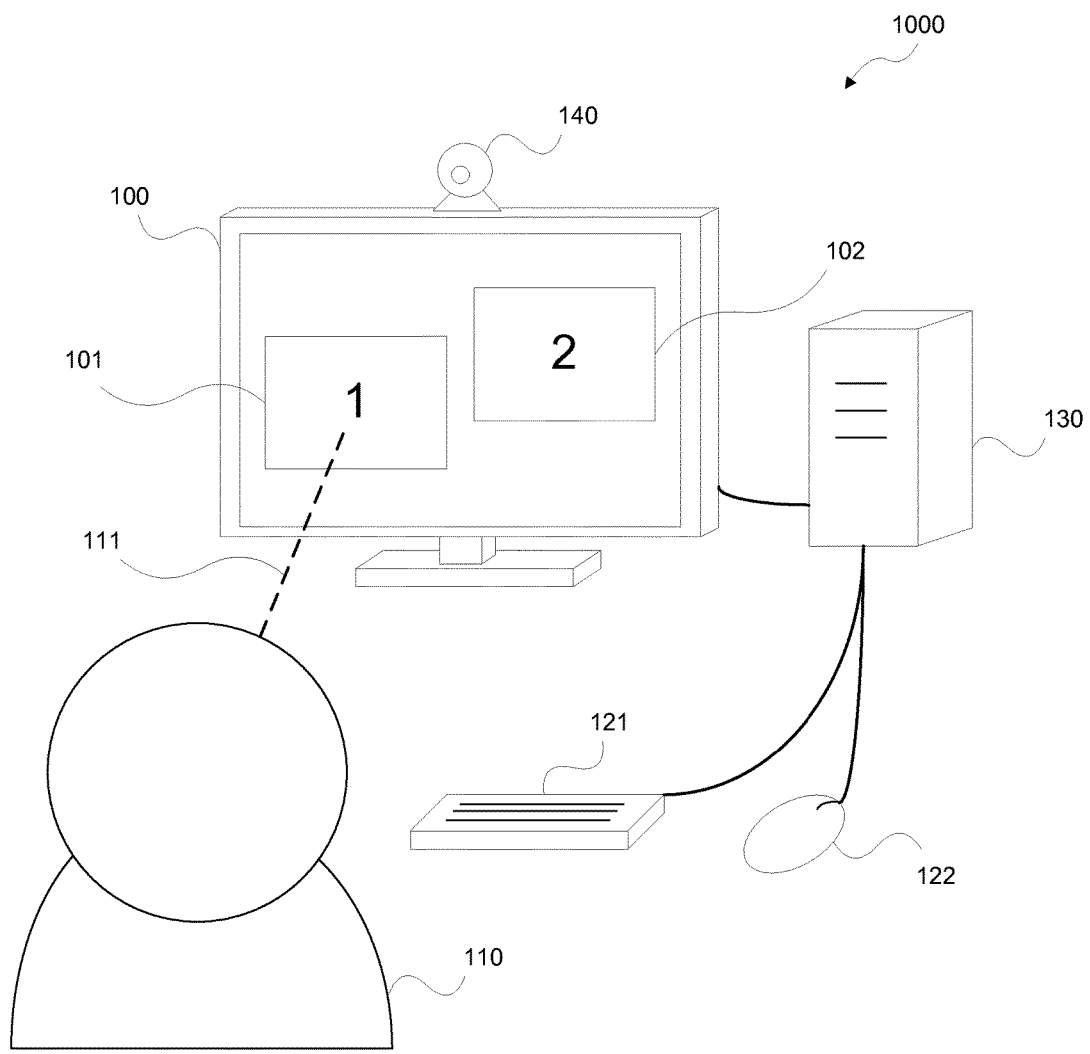
FIG. 1 is a diagram illustrating a system employing a method for controlling user input to a plurality of computer windows, according to an embodiment.

FIG. 1 depicts a diagram illustrating an exemplary system 1000 employing a method for controlling user input to a plurality of computer windows, according to an embodiment. System 1000 includes a display 100, input means (e.g., keyboard 121 and mouse 122), computer 130, and a video imaging device 140 (e.g., a webcam). Display 100 can display a plurality of computer windows, e.g., a first computer window 101 and a second computer window 102. A user 110 may direct the user's sightline 111 (i.e., the direction of the user's sight) toward one of the computer windows, e.g., first computer window 101. User 110 may provide input to computer 130, and in particular, to a program/application/file associated with an active computer window (e.g., 101, 102) displayed on display 100. For example, first computer window 101 may be an active computer window and input from keyboard 121 and/or mouse 122 may be directed to a program on computer 130 associated with first computer window 101. The user's sightline 111 may be determined from video imagery captured with video imaging device 140.

The user's sightline may be determined using any known or contemplated sight recognition (or gaze detection) technique or method. For example, determining that the user is visually focusing on a particular computer window may be done according to the methods disclosed in International Publication No. WO 2012/008827 A1, the contents of which are incorporated herein by reference.

In one embodiment, an input window and an output window are determined from the plurality of computer windows on display 100. For example, an input window may be a computer window associated with a word processing program and an output window may be a computer window associated with a reference document (such as a webpage, a PDF, a separate word processing document, etc.). The input window and the output window may be associated with the same program/application, e.g., a first word processing document and a second word processing document, or the input window and the output window may be associated with different programs/applications, e.g., a word processing application and a spreadsheet application. All user input may be directed to the input window (i.e., to the program/application associated with the input window). User input, as contemplated herein, may include two types of input commands: primary input commands and secondary input commands. Primary input commands can include, but are not limited to, keystrokes from keyboard 121 and/or motion and button clicks from mouse 122. Secondary input commands can include one or more types of input commands, such as a scrolling command. The primary and secondary input commands may be separate and exclusive of each other. For example, primary input commands may be any input command excluding a predetermined secondary input command, such as a scrolling command. Upon a determination that the user is visually focusing on the output window, the secondary input commands may be directed to the output window. Primary input commands may continue to be directed to the input window. Upon a determination that the user is visually focusing on the input window, the secondary input commands may be directed to the output window. The determinations of the user's visual focus may be performed with visual imagery of the user (e.g., by detecting the user's sightline), and may be continuous. In other words, the user's sightline may be continuously monitored to determine when the user is visually focusing on an input window or an output window.

Figure 2:
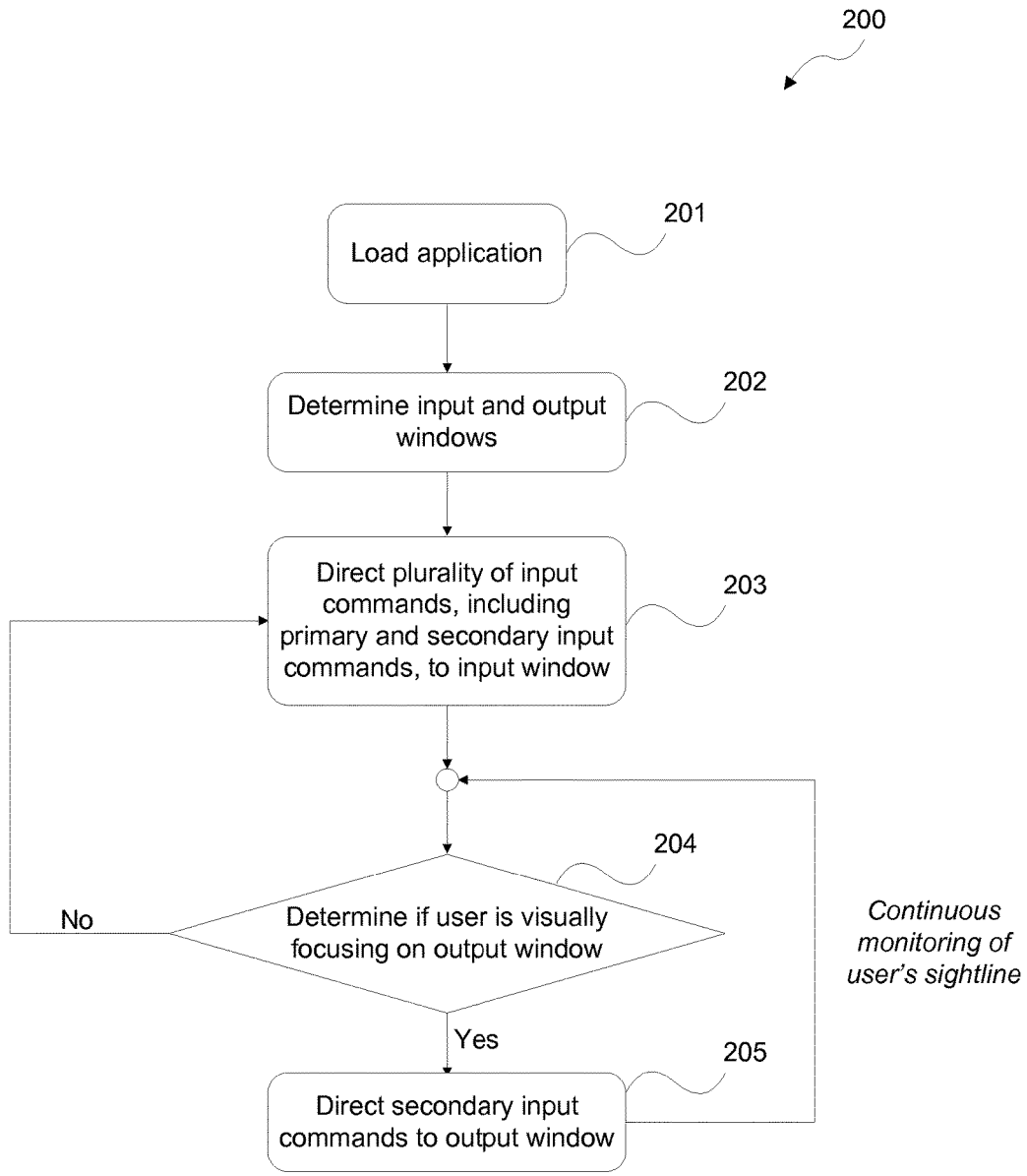
FIG. 2 is a flowchart illustrating a method for controlling user input to a plurality of computer windows, according to an embodiment.

FIG. 2 is a flowchart illustrating an exemplary method 200 for controlling user input to a plurality of computer windows, according to an embodiment. At 201, an application associated with the disclosed method is loaded on a computer. The application may engage a visual imaging device connected to the computer. The application may designate types of input commands as primary input commands and secondary input commands according to predetermined rules or settings. In one embodiment, the primary input commands may include any input command excluding a predetermined selection of other input commands, e.g., the secondary input commands. In one embodiment, the primary input commands may include any input command excluding a scrolling command provided by a scroll wheel housed in the peripheral mouse and the secondary input command may include the scrolling command provided by a scroll wheel housed in a peripheral mouse. In one embodiment, the scrolling command may be provided by a touchpad, e.g., by a swiping gesture.

At 202, an input window and an output window is determined from a plurality of computer windows displayed on a display monitor, e.g., connected to the computer running the application loaded in 201. The input window may be an active computer window, which a user may have activated by some activity, e.g., by selecting the computer window with a cursor. The output window may be an inactive computer window.

At 203, the primary input commands and secondary input commands are directed to the input window. At 204, the user's sightline is detected and it is determined whether the user is visually focused on (i.e., looking at) the output window. If the user is visually focused on the output window, at 205, the secondary input commands are directed to the output window. If the user is not visually focused on the output window, the secondary input commands are directed to the input window. The primary input commands may remain directed to the input window when the secondary input command are directed to the output window. The determination of the user's sightline (i.e., determining when the user is visually focused on the output window) may be continuously performed.

The directing of the input commands (i.e., the primary input commands, the secondary input commands) to the desired computer windows may be achieved by any method or technique known to or contemplated by those skilled the art. For example, directing the input commands may occur by sending input events over a message bus.

In some embodiments, the determining whether the user is visually focusing on an output window may include detecting that the user's sightline is directed to an area on a display associated with the output window displayed on the display. The determining whether the user is visually focusing on an output window may include determining an amount of time that the user's sightline is directed to the output window. A threshold amount of time that the user's sightline is directed to the output window may be preconfigured, and upon meeting the threshold amount of time it may be determined that the user is visually focusing on the output window.

In an exemplary scenario, according to an embodiment, a user may have two computer windows open on a display monitor, with the first window being associated with a word processing application and the second window being associated with a reference document (e.g., a webpage in a web browser). The first window may be designated as the input window and the second window may be designated as the output window. The user may enter text (i.e., primary input commands) into the first window (i.e., input window) and when the user looks at the second window the user may scroll (i.e., secondary input command) through the document displayed in the second window (i.e., output window). During the time when the user is looking at the second window, the user may continue to enter text into the document open in the first window. The user may toggle directing the secondary input commands (between the input and output windows) without physically manipulating an input device to otherwise select the desired window.

According to one embodiment, two active focus areas are simultaneously maintained within a graphic user interface on a display monitor with one active focus area designated as an input focus area and the second active focus area designated as an output focus area. Input commands are directed to the active focus areas with the primary input commands being directed to the input focus area and the secondary input commands being directed to the output focus area. In one embodiment, the secondary input commands are directed to the output focus area in response to a determination that a user is visually focusing on the output focus area. In another embodiment, the secondary input commands are directed to the input focus area in response to a determination that the user is visually focusing on the input focus area.

In an embodiment, a method disclosed herein further includes determining that the user is visually focusing on the input window and, in response to that determination, directing the secondary input commands to the input window.

The secondary input commands may include any type of input command, e.g., scrolling, page up, page down, etc. In an embodiment, the secondary input commands are a small selection of various types of input commands. In an embodiment, the secondary input commands are single type of input command. In an embodiment, the secondary input commands include scrolling commands. In another embodiment, the secondary input commands are limited to scrolling commands. In an embodiment, the primary input command include input commands provided by a keyboard.

The embodiments disclosed herein may include multiple output windows. The embodiments disclosed herein may include multiple display monitors. In some embodiments, an input window may be displayed on a first monitor and the output window may be displayed on a second monitor.

In an embodiment, a method disclosed herein further includes determining one or more additional output windows from a plurality of computer windows, determining that the user is visually focusing on one of the additional output windows, and directing the secondary input commands to that additional output window.

Figure 3:
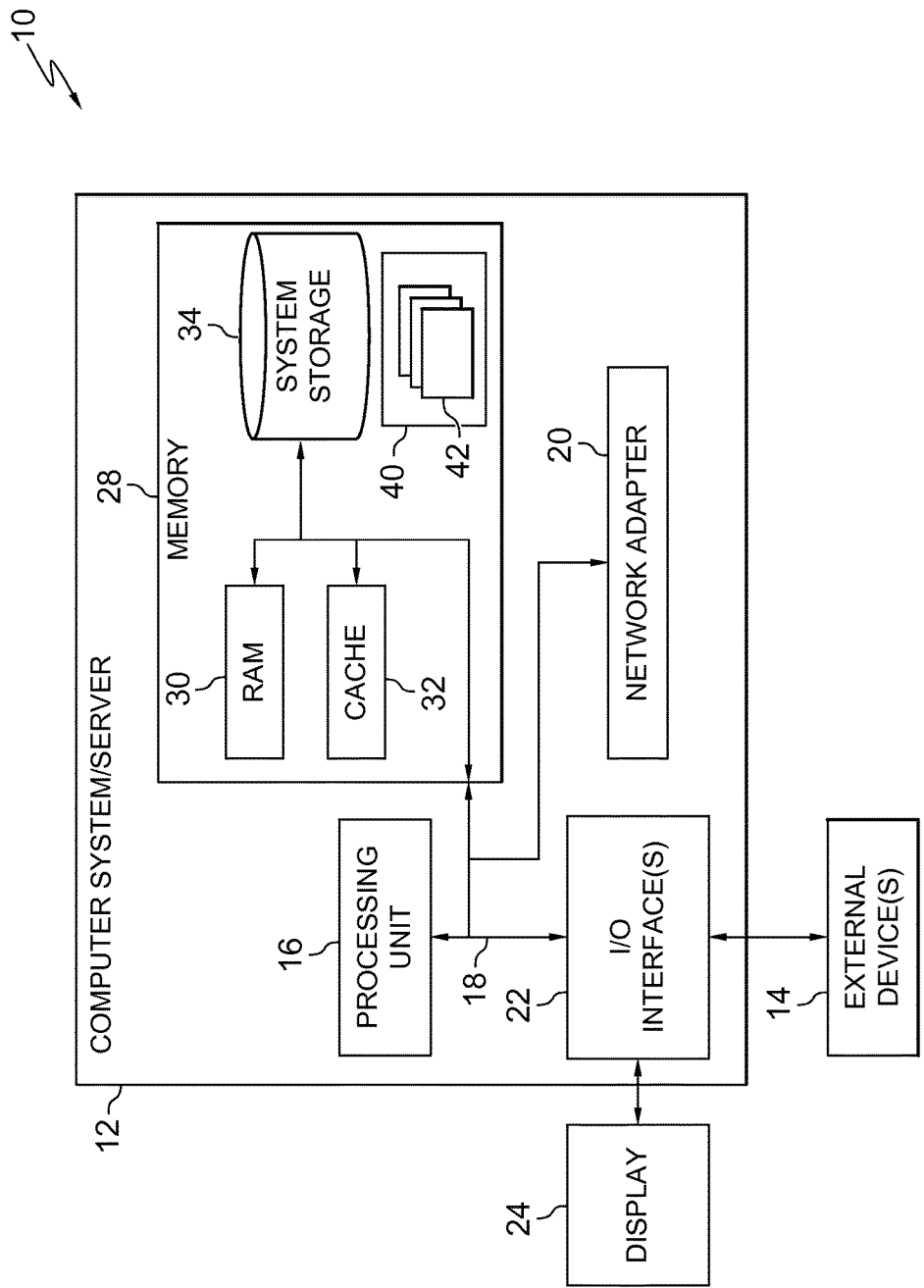
FIG. 3 is a block diagram illustrating a computing node, according to an aspect of the invention.

FIG. 3 depicts a schematic illustrating an example of a computing node. Computing node 10 is only one example of a suitable computing node and is not intended to suggest any limitation as to the scope of use or functionality of embodiments of the invention described herein. Regardless, computing node 10 is capable of being implemented and/or performing any of the functionality set forth hereinabove.

In computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed computing environments where tasks are performed by remote processing devices that are linked through a communications network. In a distributed computing environment, program modules may be located in both local and remote computer system storage media including memory storage devices.

As shown in FIG. 3, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for controlling user input to a plurality of computer windows, the method comprising:
    determining an input window from the plurality of computer windows, wherein the input window may receive one or more primary input commands and one or more secondary input commands;
    determining an output window from the plurality of computer windows, wherein the output window may only receive one or more secondary input commands;
    designating a plurality of input commands as one or more primary input commands and one or more secondary input commands, in relation to the input window and the output window, wherein the one or more primary input commands include text input provided by a keyboard, wherein the one or more secondary input commands include scrolling commands by means of a scroll wheel housed in a peripheral mouse, or a touchpad, and wherein the one or more primary input commands excludes the one or more secondary input commands;
    determining that a user is visually focusing on the output window;
    directing the one or more primary input commands to the input window and the one or more secondary input commands to the output window, while the user remains visually focused on the output window; and
    enabling the user to toggle between the input window and the output window without physically manipulating an input device.

2. The method according to claim 1, further comprising:
    determining that the user is visually focusing on the input window; and
    directing, in response to the determination that the user is visually focusing on the input window, the one or more secondary input commands to the input window.

3. The method according to claim 1, wherein the one or more secondary input commands are limited to the scrolling commands.

4. The method according to claim 1, wherein the determining when the user is visually focusing on the output window comprises:
    capturing video images of the user with a video imaging device; and
    determining, from the video images, a direction of the user's sight based on a threshold amount of time that the user's sightline is directed to the output window.

5. The method according to claim 1, further comprising:
    determining one or more additional output windows from the plurality of computer windows;
    determining that the user is visually focusing on one of the one or more additional output windows; and
    directing, in response to the determination that the user is visually focusing on the one of the one or more additional output windows, the one or more secondary input commands to the one of the one or more additional output windows.

* * * * *